(12) United States Patent
Hall et al.

(10) Patent No.: US 9,233,508 B2
(45) Date of Patent: Jan. 12, 2016

(54) RIGGING, RIGGING TERMINALS, AND METHODS OF ASSEMBLING RIGGING AND RIGGING TERMINALS FOR A SAILBOAT

(75) Inventors: Eric R. D. Hall, Bristol, RI (US); Norman Reno, Providence, RI (US)

(73) Assignee: Hall Inc., Bristol, RI (US)

( * ) Notice: Subject to any disclaimer, the term of this patent is extended or adjusted under 35 U.S.C. 154(b) by 323 days.

(21) Appl. No.: 13/129,463

(22) PCT Filed: Nov. 17, 2009

(86) PCT No.: PCT/US2009/064749
§ 371 (c)(1),
(2), (4) Date: Aug. 16, 2011

(87) PCT Pub. No.: WO2010/057167
PCT Pub. Date: May 20, 2010

(65) Prior Publication Data
US 2011/0283484 A1 Nov. 24, 2011

Related U.S. Application Data

(60) Provisional application No. 61/115,440, filed on Nov. 17, 2008.

(51) Int. Cl.
*B63B 21/08* (2006.01)
*B63H 9/10* (2006.01)
*B29C 70/86* (2006.01)
*B29L 31/30* (2006.01)

(52) U.S. Cl.
CPC ............. *B29C 70/86* (2013.01); *B63B 21/08* (2013.01); *B63H 9/10* (2013.01); *B29L 2031/3067* (2013.01); *Y10T 24/39* (2015.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 1,380,800 | A | * | 6/1921 | Watson ................. 403/211 |
| 3,739,352 | A | * | 6/1973 | Packard ................ 711/214 |
| 3,983,605 | A | | 10/1976 | Willenbring |
| 4,624,097 | A | * | 11/1986 | Wilcox ................. 57/232 |
| 4,628,630 | A | * | 12/1986 | Bohme ................ 43/43.12 |
| 7,540,250 | B2 | | 6/2009 | Sjostedt et al. |
| 2004/0156672 | A1 | | 8/2004 | Thomas |
| 2006/0054468 | A1 | * | 3/2006 | Ach .................. 198/844.2 |
| 2007/0295256 | A1 | | 12/2007 | Sjostedt et al. |

OTHER PUBLICATIONS

International Preliminary Report on Patentability for PCT/US2009/064749 issued Jan. 17, 2012.

* cited by examiner

*Primary Examiner* — Jack W Lavinder
(74) *Attorney, Agent, or Firm* — Mintz Levin Cohn Ferris Glovsky and Popeo, P.C.; Steven M. Jensen

(57) ABSTRACT

Composite rigging, rigging terminals, methods of forming composite rigging, and methods of assembling the rigging terminals in a rigging system of a sailboat incorporate a sling of composite fibers having an equivalent cross-sectional profile and stretch resistance, but greater strength and less weight as compared to steel rigging. The rigging terminal includes a terminal fitting having a first opening, a second opening, and an interior space, and a terminal insert disposed inside the interior space. The terminal insert is formed with a first end disposed toward the first opening of the fitting, first and second posts disposed on the first end, and a second end having a shape tapered and disposed toward the second opening of the fitting. One or more composite fibers can be wound around the first end of the insert and held in a space between wall of the terminal fitting interior space and the terminal insert.

16 Claims, 11 Drawing Sheets

RIGGING, RIGGING TERMINALS, AND METHODS OF ASSEMBLING RIGGING AND RIGGING TERMINALS FOR A SAILBOAT

CROSS-REFERENCE TO RELATED APPLICATION

This application claims the benefit of U.S. Provisional Application Ser. No. 61/115,440 filed on Nov. 17, 2008, the disclosure of which is expressly incorporated herein by reference in its entirety.

FIELD OF INVENTION

The subject invention relates to rigging and rigging terminals, and methods of assembling rigging and rigging terminals for use on a sailboat.

BACKGROUND OF THE INVENTION

A standing rigging system is used for stabilizing the mast of a sailboat. Standing rigging systems, which encompass continuous and discontinuous standing rigging systems, typically have rigging terminals or terminal fittings to terminate tension members, or rigging, for example, stays and shrouds. Rigging terminals are typically constructed with steel, cobalt, or titanium metals, and are formed with couples to connect parts of the rigging system together and to the body of the boat. Design of rigging terminals and material selection for rigging can significantly affect performance of the sailboat as a whole. The weight, size and shape of rigging terminals may especially affect the performance of discontinuous standing rigging systems. This is due to the fact that discontinuous standing rigging systems require more discrete or discontinuous segments of tension members, and therefore a greater number of rigging terminals.

Material selection and methods of assembling standing rigging such as stays, shrouds, and other tension members, and rigging terminals for use on sailboats typically have the following design goals: minimize weight, minimize size (for ease of installation), maximize elastic modulus, maximize tensile strength, and minimize aerodynamic drag. In choosing an appropriate material for constructing the tension members, there often is a trade off between these goals. For example, standing rigging made of synthetic polymer fibers, such as poly-p-phenylenebenzobisoxazole (PBO) fibers, can provide performance advantages by way of weight reduction over standard stainless steel rigging. Synthetic polymers, however, provide less stretch resistance than stainless steel. As a result, a greater cross-sectional area of synthetic fibers is required to construct standing rigging with an equivalent stretch resistance. Consequently, to date, PBO rigging have been significantly larger in cross-sectional area than equivalent steel rigging. Similarly, rigging terminals for PBO rigging generally are larger than their steel rigging counterparts.

Composite carbon fiber is another class of synthetic fibers that have been used to construct rigging for standing rigging systems. Composite carbon fibers typically are formed into pultruded carbon rods of about 1 mm in diameter. These carbon rods are then assembled into rigging terminals using a precisely controlled tension apparatus that attempts to equally distribute the tension load among the carbon rods. Generally, the higher the tensile strength requirement to resist a stay load, the higher the number of pultruded carbon fibers are required. Therefore, a predetermined number of pultruded carbon fibers are bundled into a given rigging terminal based on its tensile strength requirement. However, in rigging constructed with pultruded rods, unwanted spaces can form between the rods, making the total cross sectional area larger than a comparable bundle of PBO fibers. According to U.S. Pat. Nos. 6,886,484 and 6,848,381, spaces between pultruded rods can be reduced by forming hexagonal rods and assembling the hexagonal rods into rigging terminals. Consequently, rigging and rigging terminals constructed with pultruded carbon rods are also larger in cross-sectional area than their steel rigging counter parts.

While use of the above-described synthetic materials can reduce total weight of standing rigging systems by up to about 75% over the industry standard Nitronic stainless steel rigging, current design and construction techniques for composite rigging require the use of additional material having a larger cross-sectional area, due to the lower elastic modulus of composite materials as compared to stainless steel. This can result in a larger aerodynamic profile (drag) for the composite rigging. Also, when this composite rigging is assembled inside a mast, a larger internal mast space may be required and larger holes on the body of the mast may be required to accommodate the larger cross-sectional areas of the composite rigging and attendant large rigging terminals. This weakens the mast enclosure and increases the aerodynamic profile of the mast.

FIGS. 1A-1D (PRIOR ART) depict a prior art method of constructing rigging of a predetermined length and assembling terminals using composite fibers such as PBO fibers. First, as shown in FIG. 1A, a plurality of loops of PBO fibers 10 are wound around two spools 11A and 11B to form a sling 12 of PBO fibers. The spools 11A and 11B are held at a predetermined distance from each other to ensure that the loops of fibers forming the sling are held at an approximately equal tension. Referring to FIG. 1B, one end of the sling 12 is then formed into an end fitting with an "eye" opening 13. A temporary "eye" mold 17 may be used to hold the fibers of the sling 12 in place. Once formed, this "eye" opening provides a means to connect the rigging terminal to other parts of the standing rigging system, for example, the mast, or the body of the boat. Due to the nature of PBO fibers, a large-diameter "eye" mold is required to prevent the PBO fibers from breaking around the spool. A spacer 14 may be inserted adjacent to the "eye," and the PBO fibers are combined to form a rigging tension member. To protect the newly formed end fitting from environmental damage such as saltwater ingress and UV radiation, a molded plastic cover 15 may be slipped over the PBO fibers, as shown in FIG. 1C. Additionally, as shown in FIG. 1D, a braided anti-UV cover 16 may be applied to cover the PBO fibers where they are initially joined together after the wedge.

According to the above design depicted in FIGS. 1A-1D, PBO fibers with a larger cross-sectional area, as compared to equivalent steel rigging, are required to construct a rigging with a stretch resistance equivalent to steel rigging. Consequently, rigging terminals with the "eye" opening are undesirably larger than rigging terminals for steel rigging.

FIGS. 2A-2C (PRIOR ART) depict a prior art method of constructing rigging and rigging terminals using pultruded carbon fiber rods. Referring to FIG. 2A, a bundle of pultruded carbon fiber rods 21 is fed through a terminal fitting 22 with a conical interior space. A conical insert 23 is placed inside the terminal fitting to compress the carbon fiber rods toward the tapered end of the terminal fitting 22, as indicated by an arrow 24a. As shown in FIG. 2B, the conical insert 23 has been completely inserted into the interior space of the terminal fitting 22 while applying a compressive force against the carbon fiber rods 21 against the interior wall 25 of the terminal fitting 22. The compressive force is designed to create enough friction between the carbon fiber rods 21 and the conical insert 23 and between the carbon fiber rods 21 and the interior wall of the terminal fitting 22 such that the tension load on the carbon fiber rods 21 does not pull the rods 21 out of the terminal fitting 22. Additionally, referring to FIG. 2B, a terminal end 26 includes a threaded portion 28 to be screwed into the terminal fitting 22 to provide further compression of the carbon fiber rods 21 to secure the rods inside the terminal fitting 22. An "eye" opening 27 can be formed on the terminal end 26 for connecting with other rigging elements. An example of this arrangement is provided in U.S. Patent Application Publication US 2007/0295256 to Sjostedt et al., in which FIGS. 15 and 16 depict a termination end in which composite rods are retained in a conical plug, and the plug is placed inside a housing portion with a threaded end. Alternatively, as depicted in FIG. 2C, an adhesive, such as epoxy, may be applied to the surface of the conical insert 23 to provide additional holding strength through glue shear.

However, the above design depicted in FIGS. 2A-2C results in rigging and rigging terminals of relatively large cross-sectional areas as compared to equivalent steel rigging and attendant rigging terminals. A further problem with pultruded carbon fiber rods occurs during assembly, where existing processes generally do not provide a consistent load distribution without the use of complex and costly apparatuses for equally distributing the tension load among the rods.

It would be desirable to provide rigging and rigging terminals made of composite materials such as carbon fibers in which the rigging and terminals have cross-sectional areas equivalent to steel rigging, but with a significantly reduced weight, and where the rigging and terminals have a substantially consistent load distribution, without forming unwanted spaces between the fibers.

SUMMARY OF THE INVENTION

A composite rigging, a method of forming composite rigging, a rigging tension member, a rigging terminal, and a method of assembling the rigging terminal in a rigging system of a sailboat are provided. The composite rigging preferably includes a sling of composite fibers forming a cross-sectional profile substantially equal to steel rigging, and provides substantially equal stretch resistance as the steel rigging. As used herein, the term "composite fiber" or "fiber" refers to a cable, wire, or rope, as distinguished from the individual strands that make up a cable, wire, or rope. According to the present invention, a plurality of composite fibers or fibers preferably are used in the rigging system. The method of forming a composite rigging having at least two rigging terminals preferably includes the steps of: winding a sling of composite fibers having two ends and winding each end around two spools provided at a predetermined distance from each other, placing a terminal insert at each end of the sling, and assembling each end of the sling into a terminal fitting such that the composite rigging provides a substantially equal stretch resistance as compared to steel rigging, where the cross-sectional profile of the composite rigging approximates the cross-sectional profile of the steel rigging.

A rigging terminal according to the subject invention preferably includes at least a terminal fitting and a terminal insert sized to fit inside the terminal fitting. The rigging terminal preferably is an end terminal that is configured to be incorporated into composite yacht standing rigging of a sailboat. In particular, the terminal fitting can be a conical or otherwise tapered interior space into which a sling of fibers is pulled, the fibers first being wound around exterior spools. A terminal insert, in the form of a conical or otherwise tapered shouldered "tee," preferably is slid over the sling end/tee insert and tensioned until the fibers are compressed, the fibers being substantially restrained from further movement.

The terminal insert according to the subject invention preferably holds a sling of composite tensile fibers inside the terminal fitting by converting a tension force applied on the composite tensile fibers into a compressive force that compresses the composite tensile fibers between the terminal insert and the terminal fitting inside an interior space of the terminal fitting, and a pulling force that maintains the terminal insert inside the terminal fitting.

The subject invention also relates to a process by which a consistent tension load distribution across tensile fibers can be maintained when multiple tensile fibers are used in a rigging terminal.

A rigging terminal for holding one or more tensile fibers preferably includes: a terminal fitting including a first opening, a second opening, and an interior space; and a terminal insert configured to be received in the interior space of the terminal fitting, the insert having at least one end for receiving the tensile fibers, the tensile fibers being wound around the at least one end and held in at least a portion of the interior space between the terminal insert and the terminal fitting. The at least one end of the terminal insert preferably is formed with a plurality of posts, the posts being arranged to allow the insert to receive tensile fibers between the posts. These posts are preferably trimmed once the fibers are secured inside the terminal, effectively creating a final tee-like shape. A stop surface is preferably positioned between the two posts to substantially evenly support the tensile fibers. Further, the terminal insert is preferably tapered from the first end toward second end of the terminal insert. The second end of the terminal insert preferably has a cross-sectional shape such as circular, tapered, wedge-shaped, x-shaped, or flute-shaped.

A method of assembling a rigging terminal having a rigging terminal fitting and a terminal insert can include steps of: forming one or more tensile fibers into a sling of at least one hoop, feeding the sling of tensile fibers through an interior space of the terminal fitting, and securing the sling of tensile fibers around a first end of the terminal insert, such that when a force of tension is applied to the tensile fibers the terminal insert is pulled to create a compressive force against the tensile fibers toward an interior wall of the terminal fitting, locking the tensile fibers into the terminal and preventing the tensile fibers from being pulled out of the terminal. The method further can include a step of securing the sling of the tensile fibers around a first end of the terminal insert to distribute a tension load on the tensile fibers substantially equally among the tensile fibers. Further, the step of feeding the sling of tensile fibers through the interior space of the terminal fitting can include looping a high-strength thread through the sling of tensile fibers, feeding the high-strength thread through an interior space of the terminal fitting, and pulling the sling of tensile fibers through the interior space of the terminal fitting by pulling the high-strength thread.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein.

DETAILED DESCRIPTION OF THE INVENTION

A composite rigging, a method of forming composite rigging, a rigging tension member, a rigging terminal, and a method of assembling the rigging terminal in a rigging system of a sailboat are provided. The rigging terminal preferably is an end terminal that is configured to be incorporated into composite yacht standing rigging of a sailboat.

The rigging terminal preferably includes at least a terminal fitting and a terminal insert, where the terminal fitting can be formed with a conical or otherwise tapered interior space through which a sling of fibers is pulled, the fibers first being wound around exterior spools. The terminal insert, which can be a conical or a tapered shouldered "tee," i.e., including posts, preferably is inserted into the end of the sling and held briefly in a tensioning fixture to further ensure equal fiber tension. The terminal insert/sling is then pulled into the terminal until the fibers are compressed into a locked position, the fibers being substantially restrained from further movement. Once the fibers are restrained and locked in position, the posts are trimmed.

The fibers preferably are composite materials, for example, synthetic polymer fibers such as poly-p-phenylenebenzobisoxazole (PBO) or carbon fibers. The fibers optionally can be pre-impregnated with an ambient temperature or heat cure adhesive matrix and then covered with a heat tape or vacuum bags and cured into a substantially round shape. Further, the fibers can be cured into a non-circular, for example, teardrop shape to provide reduced aerodynamic drag.

The terminal fitting that covers the tee insert optionally can be used with dry fibers. The terminal fitting also is configured for use with various shapes and configurations of rigging end terminals, including but not limited to: stemballs, eyes, forks, threaded ends, and other shapes and configurations.

Figure 1A:
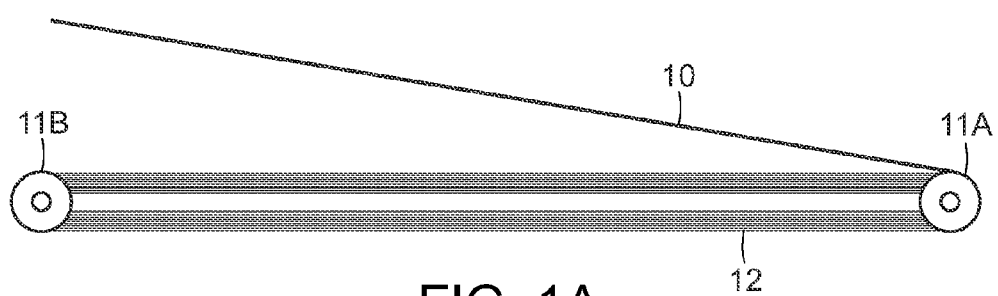
FIGS. 1A-1D (PRIOR ART) are schematic views of synthetic fibers being assembled into rigging terminals.
Figure 1B:
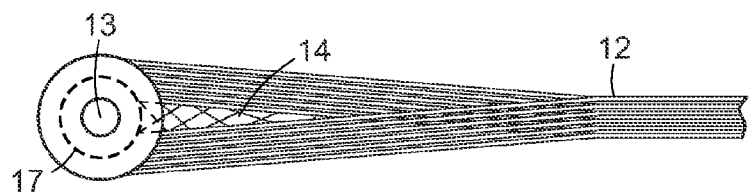
Figure 1C:
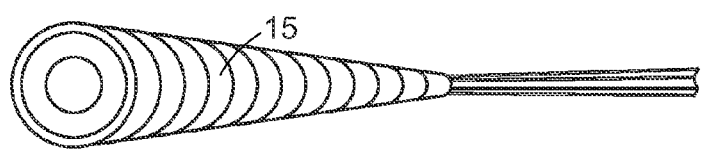
Figure 1D:
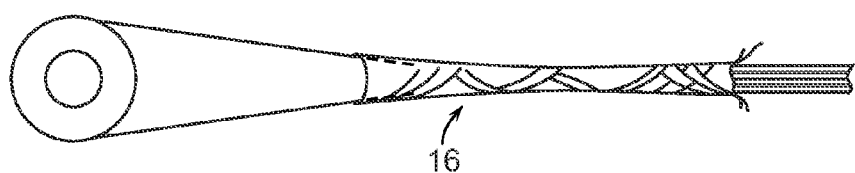
Figure 2A:
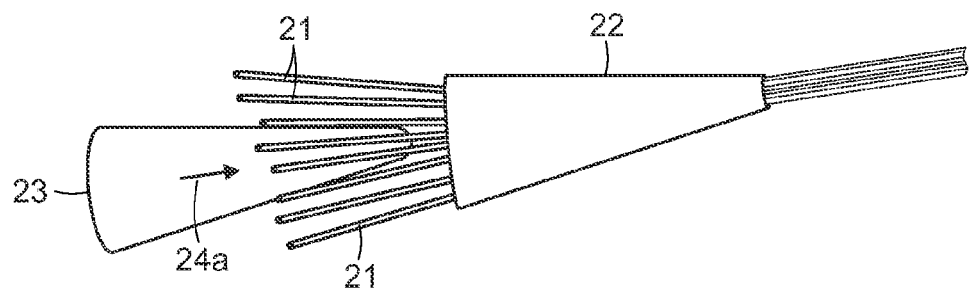
FIGS. 2A-2C (PRIOR ART) are schematic views of pultruded carbon fibers being assembled into rigging terminals.
Figure 2B:
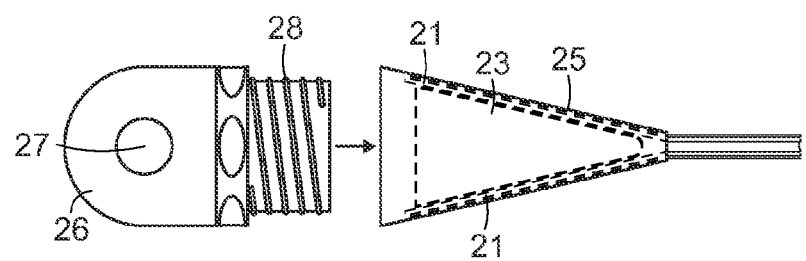
Figure 2C:
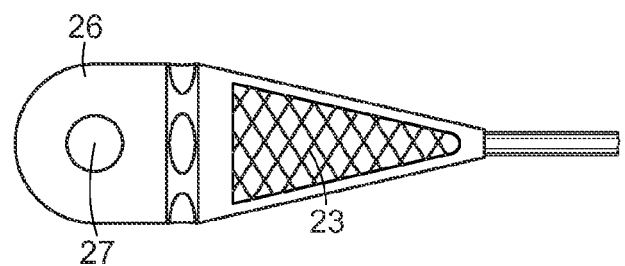
Figure 3A:
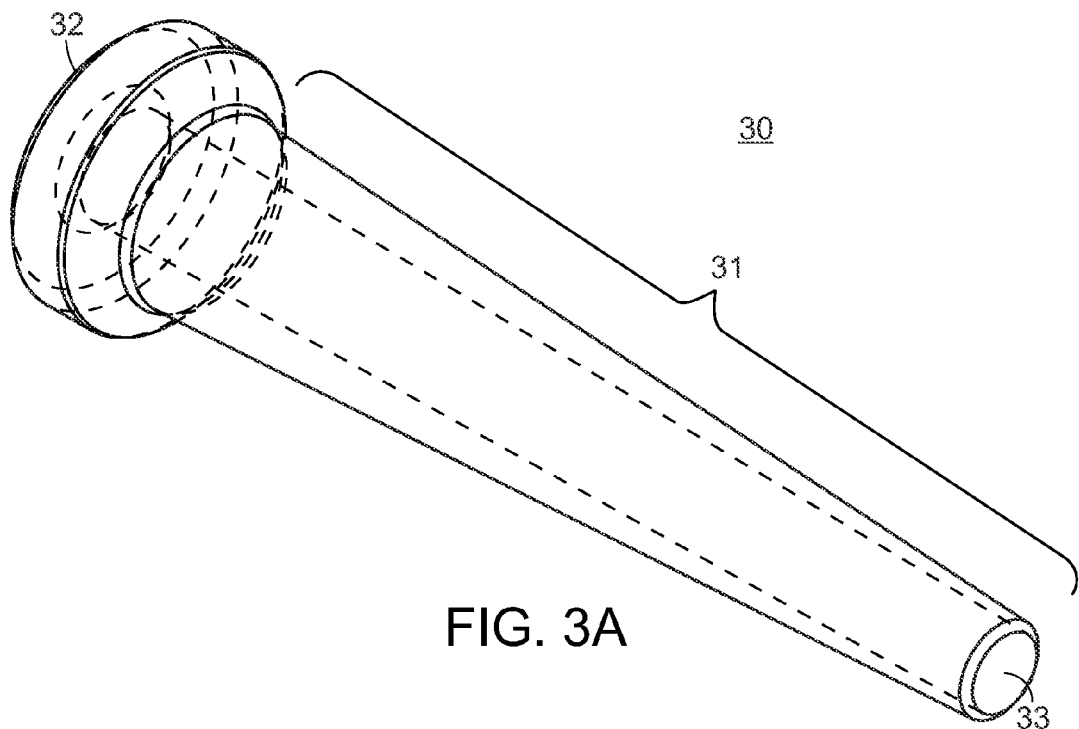
FIGS. 3A-3C are various views of a rigging terminal fitting according to the subject invention.
Figure 3B:
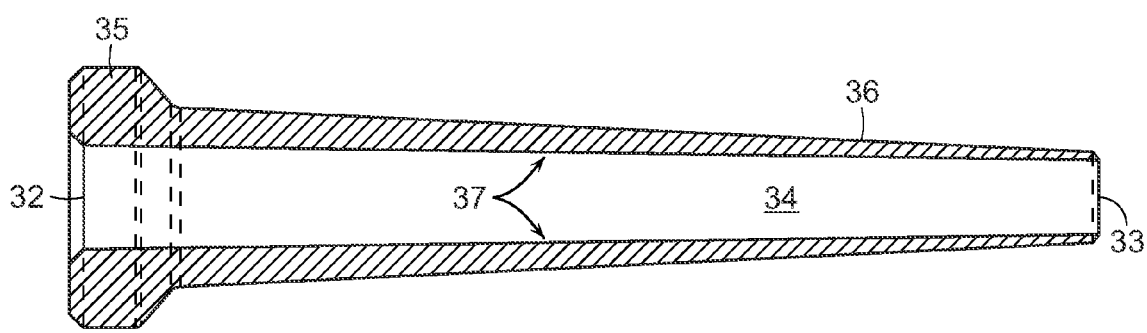
Figure 3C:
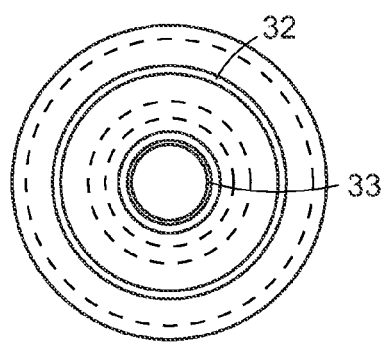

FIGS. 3A-3C depict a terminal fitting 30 having a substantially conical body 31 with a substantially circular cross-section having a first opening 32 and a second opening 33, the terminal fitting 30 being tapered between the first and second openings. It will be apparent to those of ordinary skill in the art that the cross-section may be a non-circular shape to accommodate various shapes of terminal inserts, as described later. The cross-section of the terminal fitting 30 in FIG. 3B depicts a frustum-shaped interior space 34 that is tapered from a larger first opening 32 to a smaller second opening 33 of the terminal fitting 30 for holding tensile fibers. Also, the exterior shape of the terminal fitting 30 is configured for attachment to a variety of rigging terminal carriages as discussed herein. In particular, an enhanced thickness exterior wall 35 optionally can be provided at or near the first opening 32, and a reduced thickness exterior wall 36 can be provided at or near the second opening 33.

The frustum-shaped interior space 34 preferably includes a surface 37 on which a terminal insert can be received, the interaction between the terminal insert inside the terminal fitting 30 tending to force one or more fibers toward the inside of the terminal fitting 30, such that the one or more tensile fibers can be secured between an interior wall of the terminal fitting 30 and the terminal insert (not shown in this view).

FIG. 3C is an end view of the terminal fitting through the interior space 34 of the terminal fitting 30, showing that the diameter of the first opening 32 preferably is larger than the diameter of the second opening 33.

FIGS. 4A-4D depict a terminal insert 40 configured for use with the terminal fitting 30 of FIGS. 3A-3C. A first end of the terminal insert 40 preferably is formed with one or more posts, preferably two posts 41, for guiding a sling of tensile fibers (not shown) along the terminal insert 40. At a desired position along the lengths of the two posts 41, the terminal insert 40 is formed with a rounded stop 42 to substantially evenly support the tensile fibers. The terminal insert 40 preferably is tapered toward the posts 41 to provide space for holding the sling of tensile fibers. Although two posts 41 are depicted, the two posts can be replaced by a different configuration having one or more posts. Further, a second end 43 of the terminal insert 40 preferably is shaped so as to be tapered away from the first end. The tapered profile can provide an interior space inside the terminal fitting when the terminal insert is positioned inside the terminal fitting, such that the volume of the interior space is substantially equal to the volume of the composite fibers. This can provide a substantially even compressive contact with the composite fibers along the interior space of the terminal fitting, and a substantially equal resistance is applied to the composite fibers to prevent the fibers being pulled out of the terminal fitting.

Figure 4A:
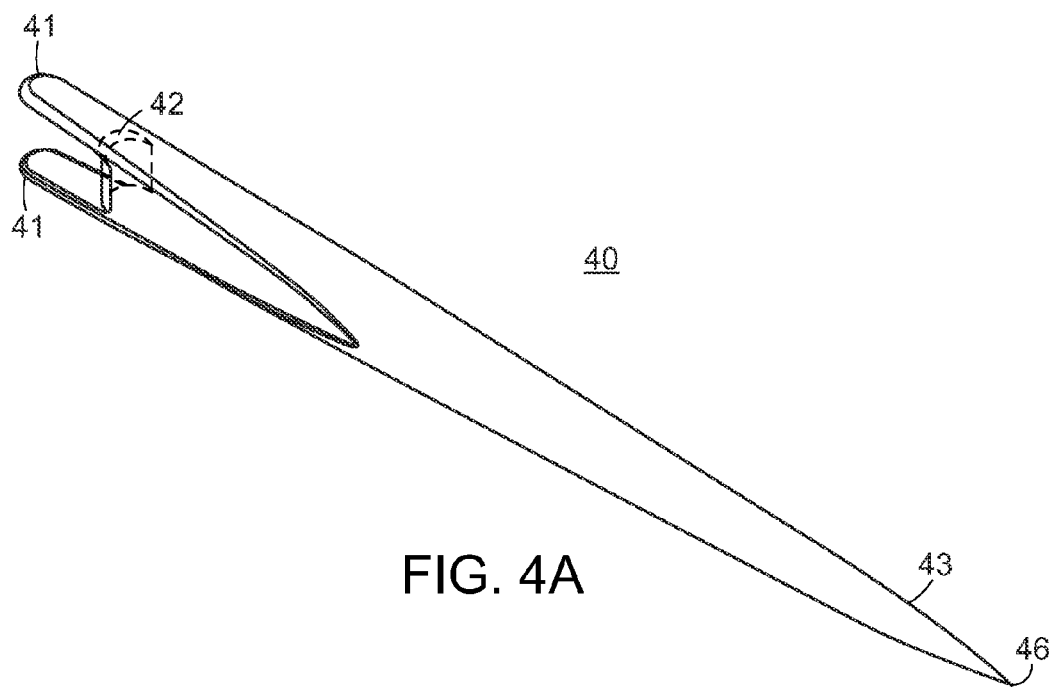
FIGS. 4A-4D are various views of a terminal insert configured for use with the rigging terminal fitting of FIGS. 3A-3C.
Figure 4B:
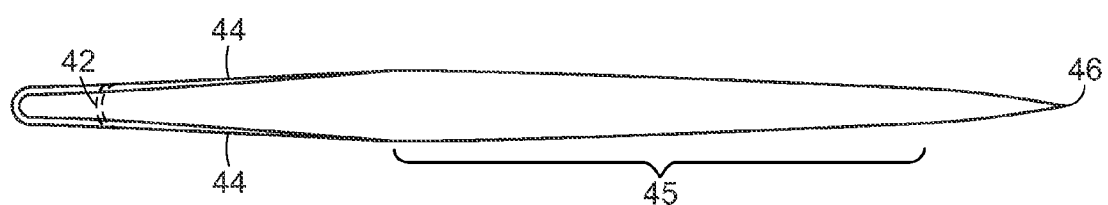
Figure 4C:
Figure 4D:
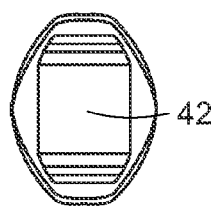

Referring to FIG. 4B, at least a portion 45 of the terminal insert 40 is shaped to approximate the frustum-shaped interior space 34 of the terminal fitting 30. As described herein, the portion of the terminal insert that approximates the frustum-shaped interior space of the terminal fitting provides a complementary surface that creates the compressive force on the tensile fibers, as the terminal insert is forcibly disposed toward the tapered end of the interior space of the terminal fitting. FIGS. 4C and 4D depict alternate views of the stop 42, where a sling of tensile fibers may be held.

Figure 4E:
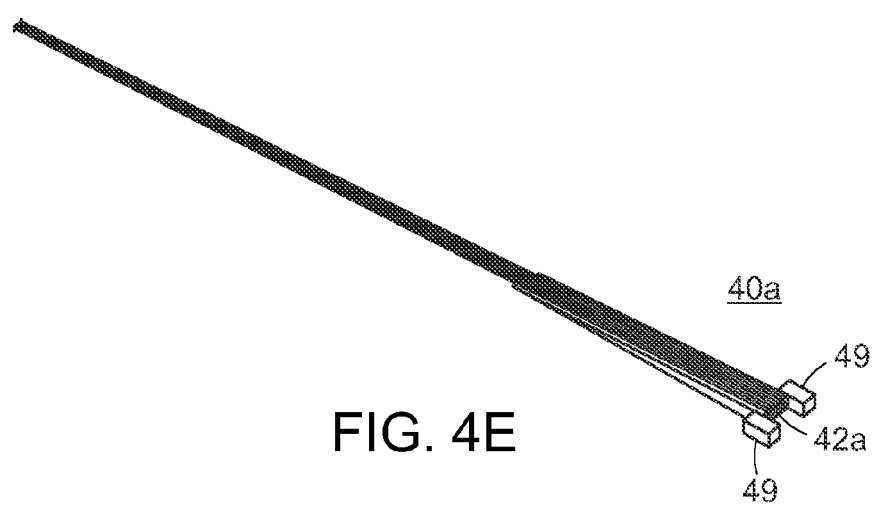
FIG. 4E is a perspective view of a terminal insert according to another embodiment of the subject invention.

FIG. 4E depicts a terminal insert according to another embodiment of the subject invention. A wedge-shaped terminal insert 40a is shaped to approximate a frustum-shaped or a tapered interior space 34 of the terminal fitting 30. The insert 40a is further provided with two posts 49. The terminal insert 40a is formed with a rounded stop 42a to substantially equally support the tensile fibers. Further, a tape adhesive may be optionally applied to the surface of the terminal insert 40a to provide further bonding with the tensile fibers.

Figure 5B:
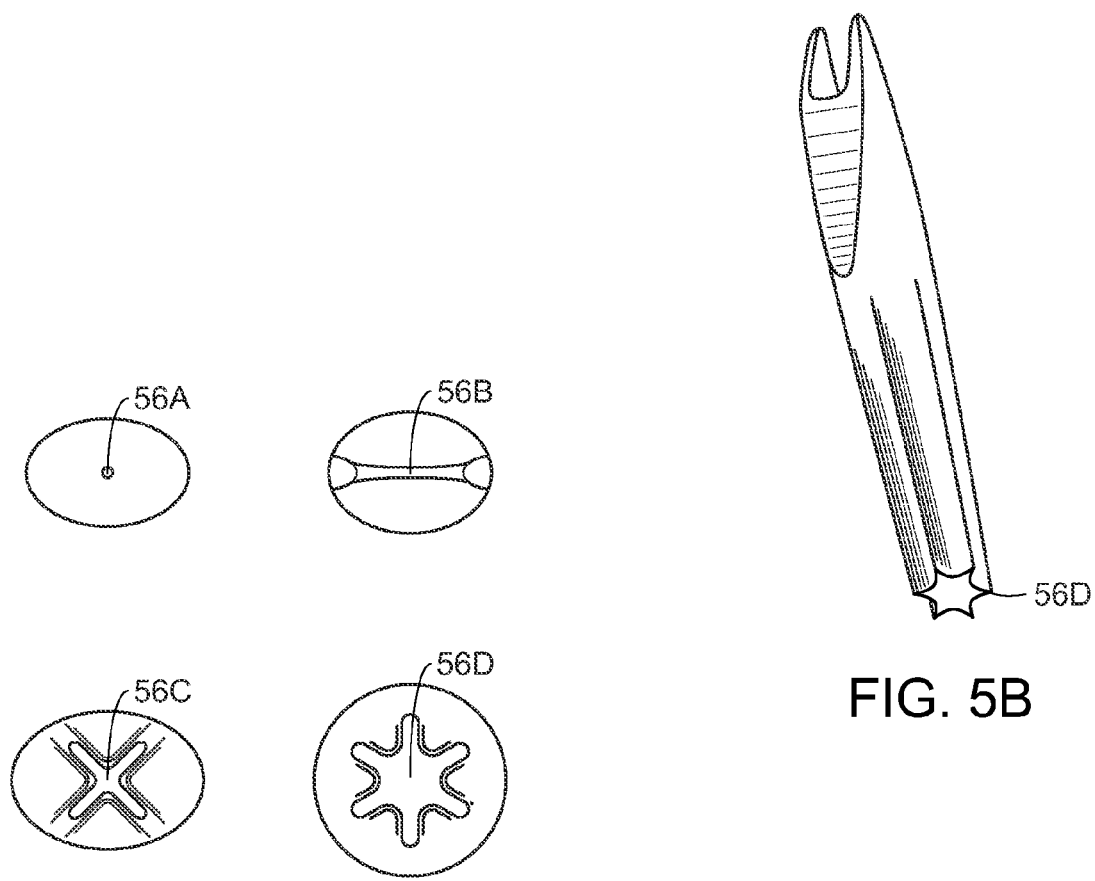
FIGS. 5A and 5B are various views showing different alternatives of the terminal insert of FIGS. 4A-4D.
Figure 5A:
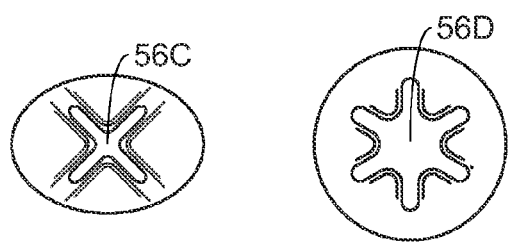

FIG. 5A depicts alternative cross-sectional shapes of the second end 43 of the terminal insert 40 depicted in FIGS. 4A-4D, where the terminal insert 40 terminates in a point 46 (see FIGS. 4A-4C). In the vicinity of the point 46, the profile of the terminal insert 40 no longer follows the profile of the interior space of the terminal fitting, as described herein (see, e.g., FIG. 6B). As described later, a narrowing of the second end 43 of the terminal insert 40 allows the tensile fibers to be combined as the fibers exit the terminal fitting 40. Alternatively, the narrowing of the second end 43 of the terminal insert 40 may take on a variety of shapes. For example, referring to FIG. 5A, instead of narrowing to a point 56A (which corresponds to the point 46 in FIG. 4A), the second end of the terminal insert may narrow to a flat wedge 56B, an X-shape 56C, or a flute 56D. FIG. 5B depicts a terminal fitting having first and second posts disposed at a first end as in FIGS. 4A-4D, and including a flute-shaped second end 56D.

Figure 6A:
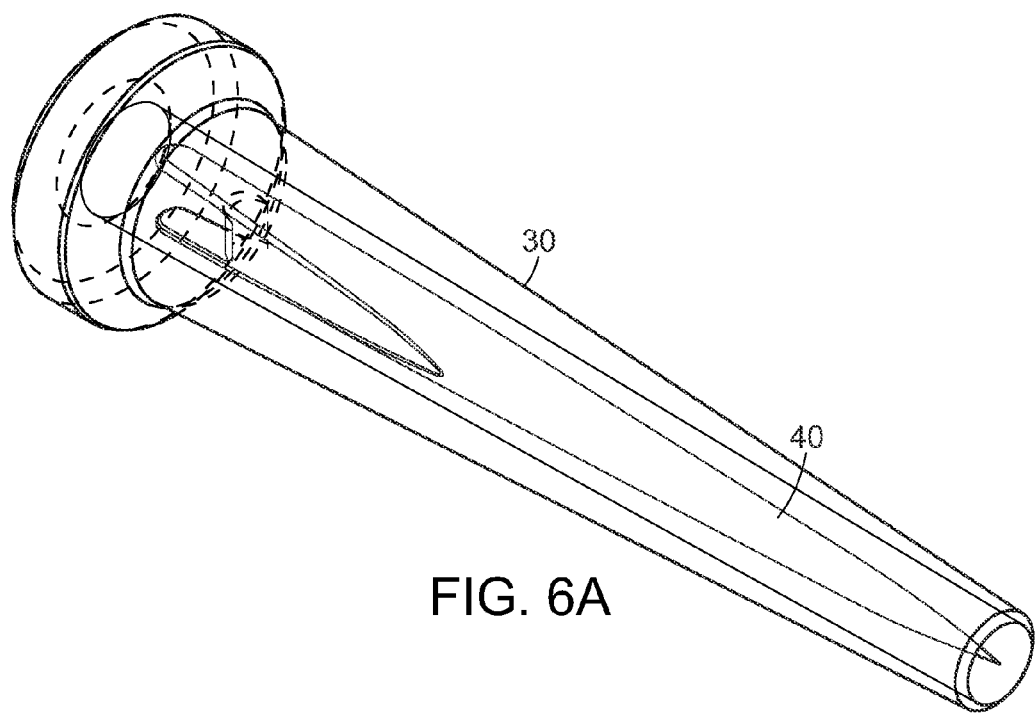
FIGS. 6A-6C are various views of a terminal insert assembled to a terminal fitting, in which the tension fibers are omitted for clarity.
Figure 6B:
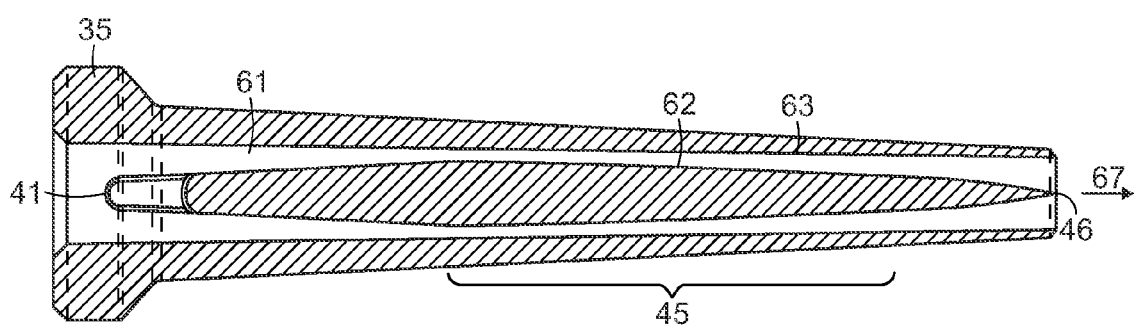
Figure 6C:
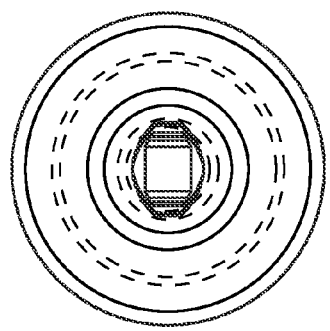

Referring to FIGS. 6A-6C, the terminal insert 40 is disposed inside the terminal fitting 30. In the cross-sectional view of FIG. 6B, at least some of an interior space 61 of the terminal fitting 30 is substantially filled by the terminal insert 40. As described herein, along at least a portion 45 of the terminal insert 40, a surface 62 is provided that is complementary to a corresponding surface 63 of the terminal fitting 30. As the terminal insert 40 is inserted into the interior space 61, the two surfaces 62 and 63 substantially compress the tensile fibers held inside the interior space 61. This provides a force that holds the tensile fibers inside the terminal fitting 30 while the fibers sustain a tension load in a direction denoted by an arrow 67. The interior space 61 can be filled to a lesser extent as the terminal insert 40 tapers toward the two posts 41 disposed at the first end of the terminal insert 40 and the end point 46 of the second end.

Figure 6D:
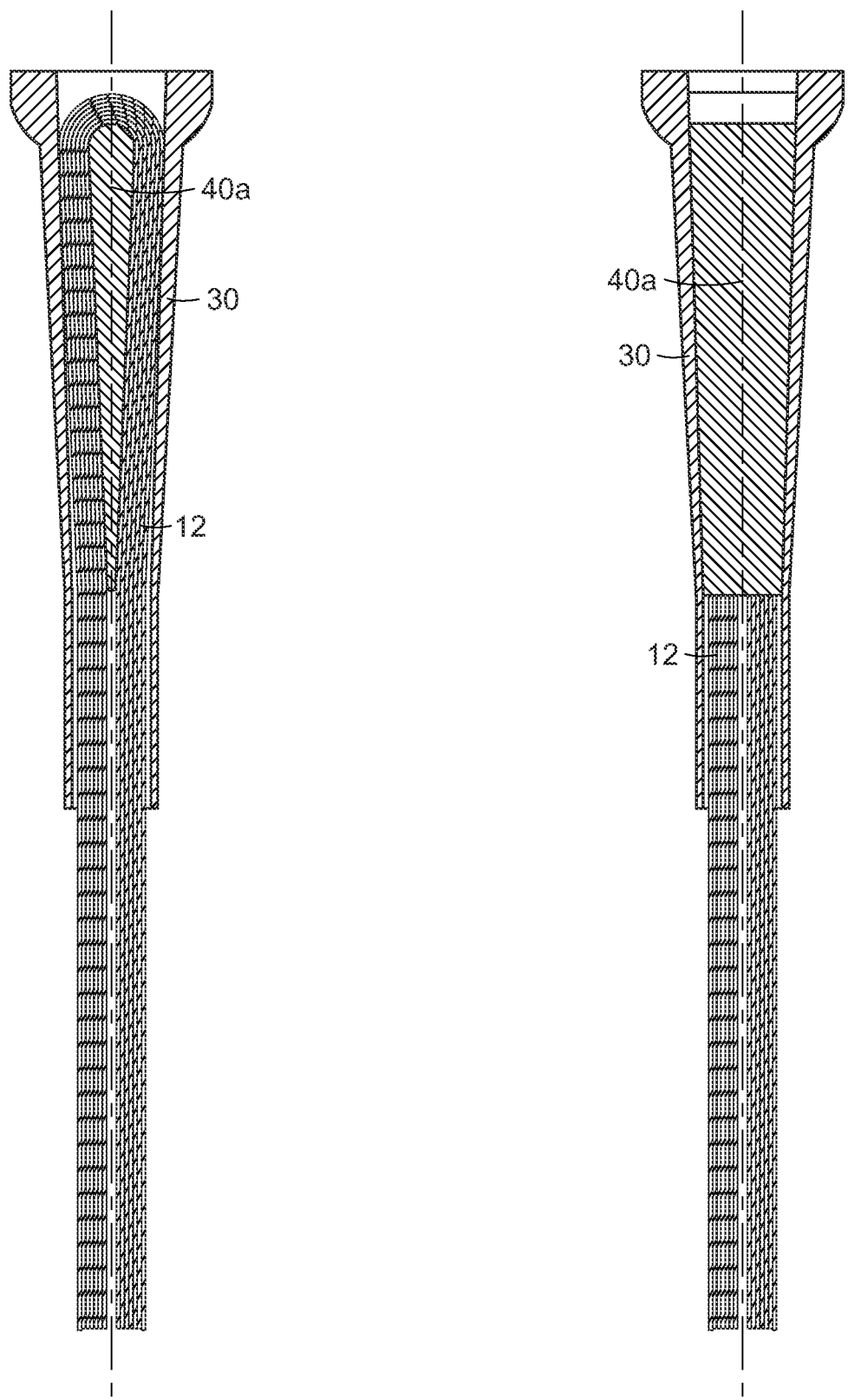
FIG. 6D depicts different views of the terminal insert of FIG. 4E assembled into a terminal fitting.

FIG. 6D depicts a terminal insert 40a inserted into a terminal fitting 30. As shown, a sling of tensile fibers 12 is being held by terminal insert 40a inside the terminal fitting 30. The posts 49 have been trimmed off of the terminal insert 40a in a process described later.

Figure 7A:
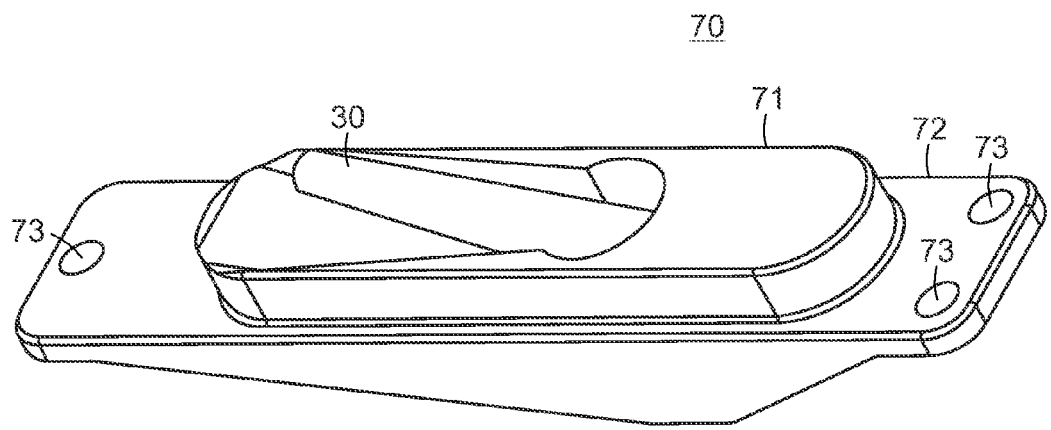
FIGS. 7A-7C are various views of a rigging terminal being held by a terminal anchor, such as a mast tang, according to the subject invention.

FIG. 7A shows a rigging terminal 30 disposed inside a rigging terminal carriage 70 suitable for coupling with the terminal fitting 30 according to the subject invention. The terminal carriage 70 includes at least an elevated housing cover 71 disposed on a mounting platform 72. The mounting platform 72 may further include a number of mounting holes 73 for securing the mounting platform 72 on another part of the standing rigging, for example, the mast. FIG. 7C is a side cross-sectional view depicting the terminal carriage with a terminal fitting 30 disposed inside thereof. The terminal carriage 70 preferably includes a recessed cavity 75 for receiving at least one end of the terminal fitting 30. As shown, a sling of composite tensile fibers 12 can be wound around the terminal insert 40, and the terminal insert 40 inserted into the terminal fitting 30.

Figure 7B:
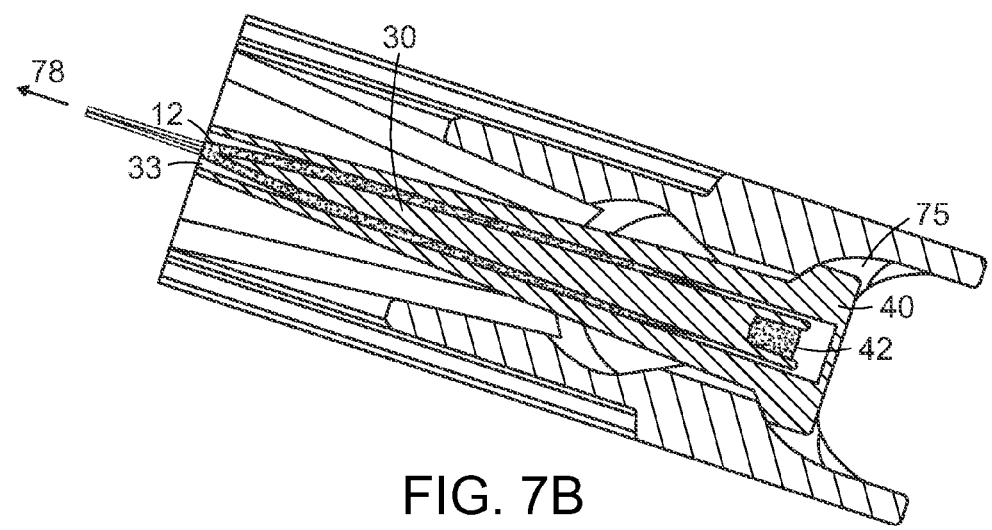
Figure 7C:
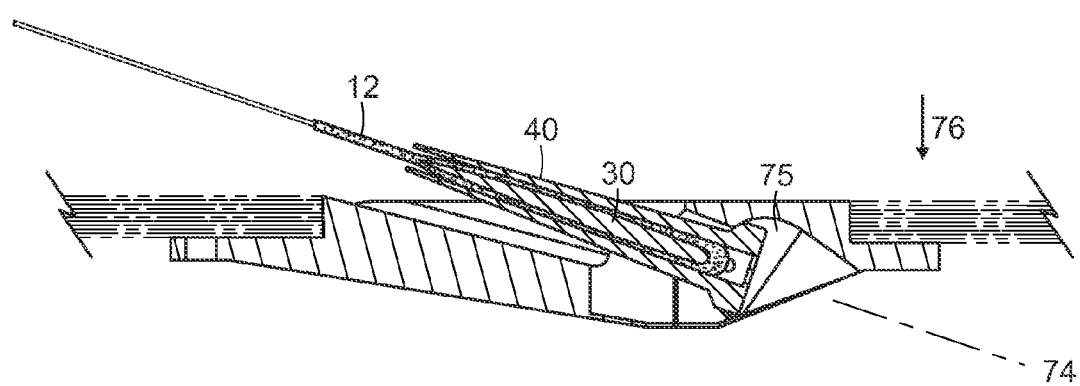

FIG. 7B is a cross-sectional view of the terminal carriage 70 as viewed from above (see arrow 76). Referring to FIG. 7B, the sling of composite tensile fibers 12 can be disposed between the terminal insert 40 and the terminal fitting 30, inside the interior space of the terminal fitting 30. The sling of tensile fibers preferably traverse the length of the terminal insert 40, and is wound around a base surface 42 of the terminal insert 40. Preferably, a tension load on the composite tensile fibers along the direction denoted by an arrow 78 further pulls the terminal insert 40 toward the tapered second opening 33 of the terminal fitting 30. Consequently, an additional compressive force is created between a surface 62 of the terminal insert 30 against a surface 63 of the terminal fitting 40 that provides added holding force to maintain the composite tensile fibers inside the terminal fitting 30 (see FIGS. 6A-6C).

In accordance with the above-described components of a rigging terminal assembly, a preferred method of assembling composite tensile fibers with the terminal insert and the terminal fitting into a rigging terminal will be described with reference to FIGS. 8A-8F. In particular, the method proceeds from FIGS. 8A to 8D, and further to a final step of FIG. 8F, where FIG. 8E depicts an optional step incorporating the use of a high-strength thread 81 and, optionally, a needle 82.

Figure 8A:
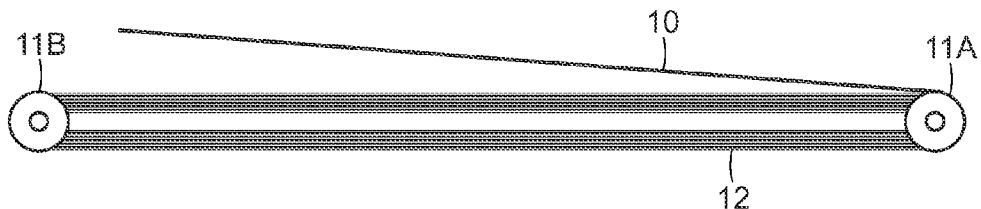
FIGS. 8A-8F are schematic views of carbon fibers being assembled into a rigging terminal according to the subject invention.

Referring to FIG. 8A, a tow 10 of carbon fiber (e.g., in the form of a bundle or knitted tape) is wound around two spools 11A and 11B to form a sling 12. The sling 12 of carbon fibers is preferably impregnated with an ambient temperature or heat cure matrix to provide additional adhesive strength before, during, or after this process.

Figure 8B:
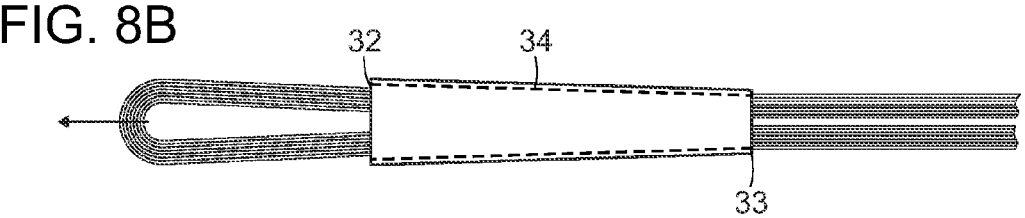
Figure 8C:
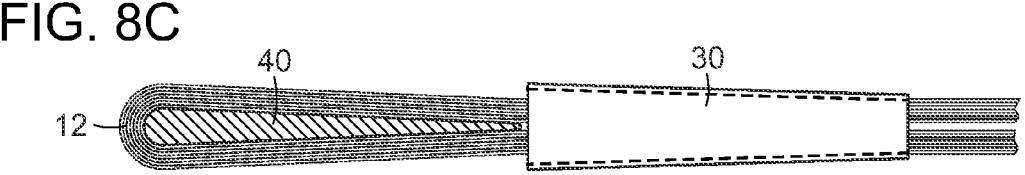
Figure 8D:
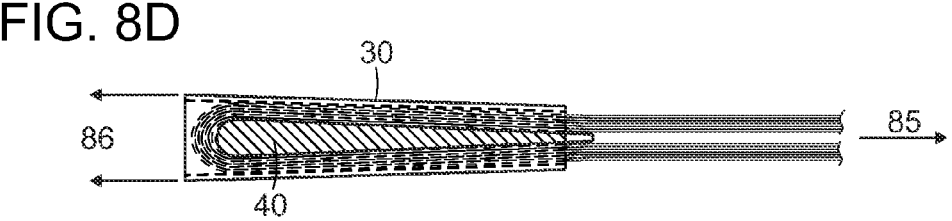
Figure 8E:
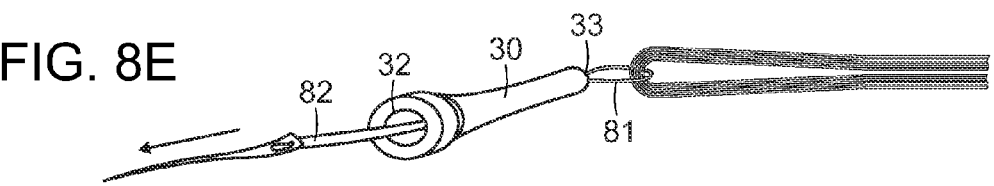

In FIG. 8B, the sling 12 of carbon fibers is fed through the second opening 33 of the terminal fitting 30, across the interior space 34 of the terminal fitting 30, and finally through the first opening 32. As shown in FIG. 8E, the sling 12 of carbon fibers optionally can be first looped through a high-strength thread 81. The high strength thread 81 preferably is fed through a needle 82. Once the needle 82 and the high-strength thread 81 are passed though the second opening 33 and the first opening 32 of the interior space 34 of the terminal fitting 30, the sling 12 is pulled through the interior space 34 as well. The terminal insert 40 is then placed inside the sling 12 once the sling 12 is pulled through the interior space 34, as shown in FIG. 8C.

Figure 8F:
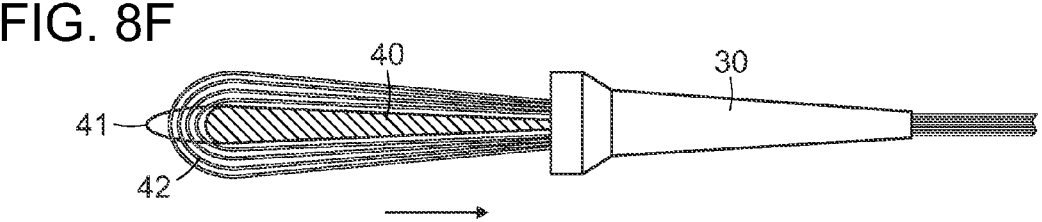

Further, as shown in FIG. 8F, the sling 12 is placed between the two posts 41, 42 of the first end of the terminal insert 40. Finally, as shown in FIG. 8D, the sling 12 of carbon fiber is pulled back toward the second opening of the terminal fitting 30 in the direction denoted by an arrow 85 while the terminal fitting 30 is held or pulled in the direction denoted by an arrow 86. A tension force preferably is applied in the direction 85, pulling the terminal insert 40 into the interior space of the terminal fitting 30 and creating a compressive force along the length of the carbon fibers received inside the interior space 34. Also, the rounded surface 42 of the first end of the terminal insert 40 can distribute the pulling force of the carbon fiber sling 12 substantially evenly across the rounded end such that the force does not break fibers in the carbon fiber sling 12.

Figure 8G:
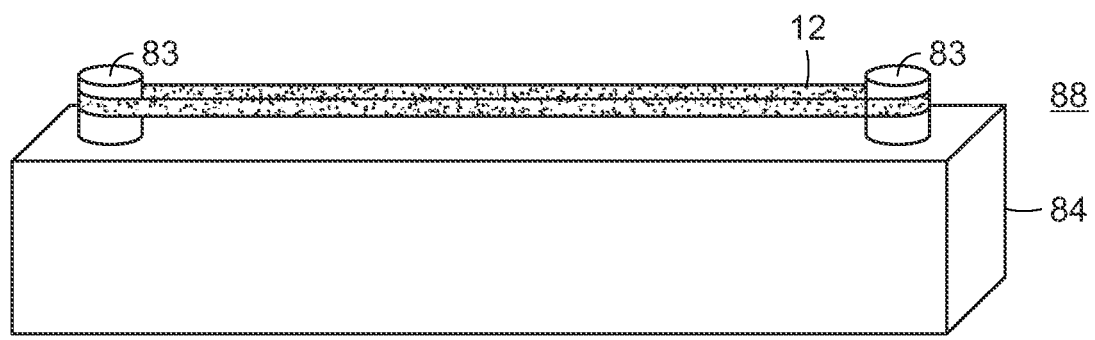
FIGS. 8G-8L are various views of steps in a process for assembling a rigging tension member using carbon fiber tapes or tows that are pre-impregnated with adhesives.
Figure 8H:
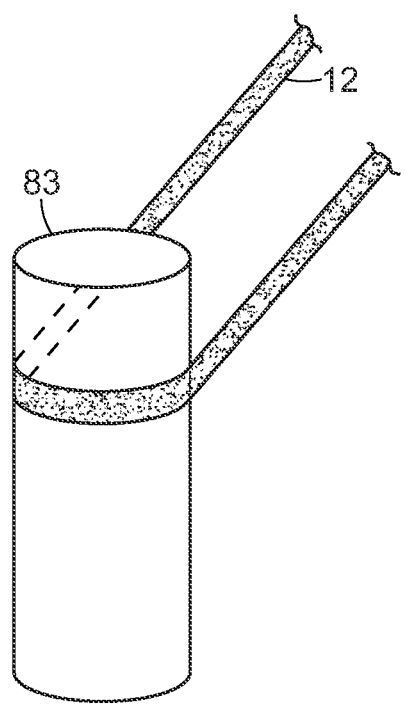
Figure 8I:
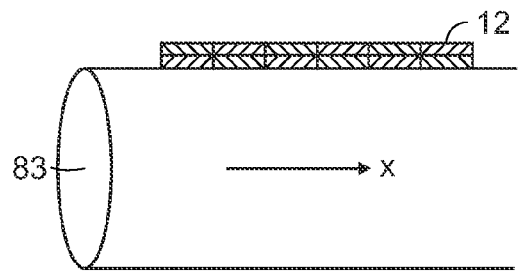
Figure 8K:
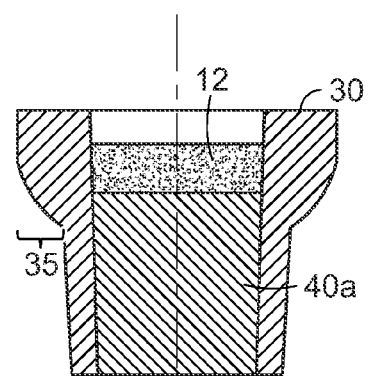
Figure 8J:
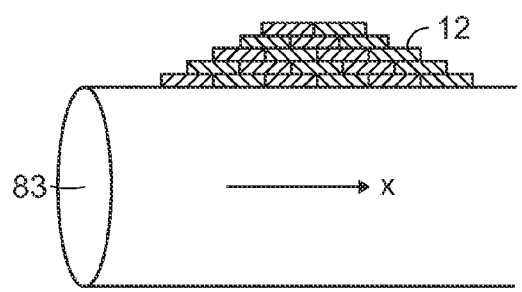

As shown in FIGS. 8G and 8H, a carbon fiber tape pre-impregnated with a heat-cured adhesive matrix may be used to form the sling 12. A winding apparatus 88 is formed with two spools 83 on a rigid beam 84. The length of the beam 84 and the positions of the spools 83 is determined according to a length for a rigging tension member to be assembled with two rigging terminal according to the subject invention. As shown in FIGS. 8G and 8H, a tape of carbon fibers pre-impregnated with a heat-cure adhesive matrix is wound around the two spools 83 such that each loop in the sling is held at substantially the same tension. The carbon fiber tape has a thickness and the cross-section of the loops of tape in the sling 12 formed around the spools 83 is shown in FIGS. 8I and 8J. The positions of consecutive loops of sling 12 may be translated along a direction X (along the spool 83) such that consecutive loops may be placed adjacent to each other or overlapping each other.

It should be appreciated that one can form a sling of carbon fiber tape, or tow, around three or more spools to form a branched rigging. For example, to form a rigging with two branches, that is, a first rigging terminal holding composite fibers from both a second and a third rigging terminals, one begins by winding a loop around a first spool and a second spool. As the loop of carbon tow is wound around the first spool a second time, the carbon tow is wound around a third spool. Subsequently, loops are formed around the first and second spools and around the first and third spools alternately. When a predetermined number of loops are wound around each of the second and third spools, the "branched" slings are assembled into three terminal fittings to form a branched rigging.

Figure 8L:
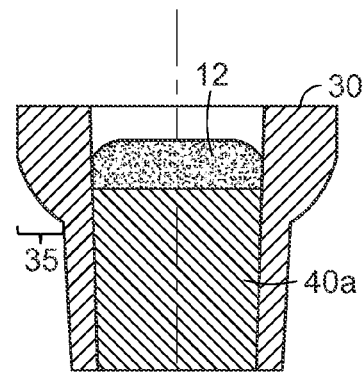

For each rigging tension member, a predetermined number of loops of carbon tape is required to achieve a predetermined tension resistance. For a predetermined number of loops of carbon tape, the loops may be wound to form a sling having a substantially rectangular cross-sectional profile, as shown in FIG. 8I, or the loops may be wound to form a sling having a rounded profile, as shown in FIG. 8J. Depending on the cross-sectional shape of the interior space of the terminal fitting 30, the cross-sectional shape of the sling of carbon tape 12 may be varied to fit inside the terminal fitting 30. For example, a sling with a rounded cross-sectional profile can provide a more even fitting inside a terminal fitting with a substantially round interior cross-sectional shape. This provides an advantage of evenly distributing the compressive force provided by the insert 40a to hold the sling inside the fitting. Additionally, this allows the tension member to be more easily formed to provide an aerodynamically advantageous profile, such as a tear drop shape. Furthermore, by shaping the sling to approximate the interior cross-sectional shape of the terminal fitting minimize the size of the terminal fitting. In other words, the thickness of the enhanced exterior wall 35 of terminal fitting 30, as shown in FIGS. 8K and 8L, may be optimized for a given cross-sectional shape of interior space of terminal fitting 30, such that a aerodynamic profile and a total weight of the terminal fitting is minimized.

Two posts disposed at a predetermined distance from each other may be used to wind the carbon fiber into a sling. By using posts at a fixed distance, the fiber is loaded at an approximate constant tension to ensure that the tension loading among the loops of fibers are approximately equal.

According to the subject invention, a tape of carbon fibers pre-impregnated with heat-cure adhesive matrix can be wound to form the sling of carbon fibers. These carbon fibers tapes are typically about 0.5 mm in thickness. As shown in FIG. 8K, as loops of carbon tapes are wound around a knob, a cross section of the carbon tapes is formed. For a given cross-sectional profile of the terminal fitting, the placement of the carbon tapes may be varied to provide a substantially even compression/locking inside the interior space of the terminal fitting.

Figure 9A:
FIGS. 9A-9B are schematic views of alternative terminal ends that can be used with the rigging terminal of the subject invention.
Figure 9B:

It should be understood from the foregoing description that the terminal fitting may be outfitted with a variety of terminal ends for fitting with different terminal carriages or other members of the rigging system. For example, FIG. 9A shows a terminal fitting with a threaded-end shaped terminal end 91 for coupling with a threaded terminal carriage. As another example, FIG. 9B shows a terminal fitting with a stemball terminal end 92 for coupling with a slotted stemball terminal carriage.

The methods described above encompass rigging and rigging terminals that are substantially smaller in cross-sectional area as compared to conventional methods that utilize composite materials. These methods also provide rigging that are substantially equal in size compared to steel rigging of equivalent stretch resistance.

For example, composite rigging constructed with the methods of the subject invention can provide a substantially equal cross-sectional profile compared with steel rigging of equivalent stretch resistance. This composite rigging can exceed steel rigging in the amount of breaking forces or breaking strength or breaking load.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A rigging terminal for holding a plurality of individual composite fibers, comprising:
 a terminal fitting including a first opening, a second opening, and an interior space; and
 a terminal insert configured to be received in the interior space of the terminal fitting, the terminal insert having at least one end for receiving the composite fibers, the composite fibers being wound around the at least one end and held in the interior space between the terminal insert and the terminal fitting, and the at least one end with the composite fibers being completely enclosed within the terminal fitting
 so as to substantially equally support the composite fibers via the terminal insert, in which a tension load is distributed substantially equally among the composite fibers.

2. The rigging terminal of claim 1, wherein the at least one end of the terminal insert is formed with a plurality of posts, the posts being arranged to receive the composite fibers.

3. The rigging terminal of claim 1, wherein the at least one end of the terminal insert is formed with two posts for receiving the composite fibers.

4. The rigging terminal of claim 3, further comprising a stop positioned between the two posts to substantially evenly support the composite fibers.

5. The rigging terminal of claim 3, wherein the terminal insert includes first and second ends, the two posts being positioned at the first end of the terminal insert.

6. The rigging terminal of claim 5, wherein the terminal insert is tapered between the first end and the second end of the terminal insert.

7. The rigging terminal of claim 5, wherein the second end of the terminal insert has a cross-sectional shape selected from the group consisting of: circular, tapered, wedge-shaped, x-shaped, and flute-shaped.

8. The rigging terminal of claim 1, wherein the composite fibers are pre-impregnated with an ambient temperature or heat cure matrix.

9. The rigging terminal of claim 8, wherein the terminal fitting has at least one end shaped as a stemball terminal end.

10. The rigging terminal of claim 8, wherein the terminal fitting has at least one end shaped as a threaded end.

11. The rigging terminal of claim 1, wherein the composite fibers comprise dry fibers.

12. The rigging terminal of claim 1, wherein the composite fibers form a cross-sectional profile substantially equal to steel rigging of equivalent stretch resistance.

13. A method of assembling a rigging terminal having a rigging terminal fitting and a terminal insert, comprising the steps of:
 forming a plurality of individual composite fibers into a sling by winding the composite fibers around at least one end of the terminal insert;

feeding the sling of composite fibers through an interior space of the terminal fitting, the at least one end of the terminal insert with the composite fibers being completely enclosed within the terminal fitting; and applying a tension force to the composite fibers such that the terminal insert is pulled into the terminal fitting to create a compressive force against the composite fibers toward an interior wall of the terminal fitting so as to substantially equally support the composite fibers via the terminal insert, in which a tension load is distributed substantially equally among the composite fibers.

14. The method of claim 13, further comprising the step of:

holding the sling of composite fibers around the at least one end of the terminal insert.

15. The method of claim 14, wherein the step of holding the sling of composite fibers is configured to distribute a tension load on the composite fibers substantially equally among the composite fibers.

16. The method of claim 13, wherein the step of feeding the sling of composite fibers through the interior space of the terminal fitting further comprises the steps of:

looping a high-strength thread through the sling of composite fibers;

feeding the high-strength thread through an interior space of the terminal fitting; and pulling the sling of composite fibers through the interior space of the terminal fitting by pulling the high-strength thread.

\* \* \* \* \*